Patented Dec. 23, 1930

1,786,149

UNITED STATES PATENT OFFICE

CHARLES H. CAMPBELL, OF PITTSBURGH, PENNSYLVANIA, ASSIGNOR, BY MESNE ASSIGNMENTS, TO PETER COOPER CORPORATIONS, OF WILMINGTON, DELAWARE, A CORPORATION OF DELAWARE

RECLAIMED RUBBER

No Drawing. Application filed August 9, 1929. Serial No. 384,806.

The invention relates to an improvement in reclaimed rubber meaning the product obtained from rubber that has once been vulcanized and afterward devulcanized.

Some considerable part of the reclaimed rubber obtained at the present time is from rubber highly resistant to abrasion due to the large percentage of lamp black in it. Tire tread stock is an example of such. In order to soften or plasticize the reclaim to fit it for working purposes the common practice has been to use oil during the devulcanizing process. In the ordinary devulcanizing process various kinds of rubber are treated at the same time. Some of the rubber is highly resistant to abrasion due to the high percentage of lamp black in it as aforesaid, and other of the stock is of a softer character. If enough oil of any type is used in the devulcanizing process to soften the rubber more resistant to abrasion, or that having a high percentage of lamp black content, the balance of the stock is apt to be rendered too soft and part of the finished product will be mushy in the attempt to soften the harder parts or particles. If the harder parts or particles are not softened the finished product will contain a very high percentage of tailings. There is no known oil on the market today that will properly soften all portions of a reclaim containing different types of rubber, and unless the reclaimer treats only rubber of the same general type or character he is faced with a somewhat difficult problem.

The use of collagen with the rubber scrap during the devulcanizing process as described in my co-pending application Serial No. 321,279, which issued Oct. 1, 1929, as Patent No. 1,729,706, is very beneficial in the devulcanizing of scrap of a miscellaneous character with or without the use of oil or in any event such amount of oil as is ordinarily employed, and this especially in the production of the softer grades of reclaim. I have found however that greatly improved results are obtained especially in cases where the rubber scrap contains some considerable amount of rubber highly resistant to abrasion, on account of the large percentage of lamp black in it, if the collagen employed be of a nature more or less resistant to the hydrolytic action of the devulcanizing process, or in other words, of such nature that it will not too easily break down during the devulcanizing process. Such a collagen I have found existent in tanned leather, and by tanned leather I mean leather of either a vegetable or a mineral tannage, or a combination of both. The cleavage products formed from the breaking down of the tanned leather evidently possess the power of penetrating and softening the particles of hard stock without rendering the softer stock soft and mushy in the operation. Consequently a resultant product is obtained having a very high percentage of finished reclaim with a very low percentage of tailings.

The resultant product is also improved especially when it is desired to obtain a reclaim of the harder type, and is one of an exceedingly fine grain which will mill and strain to advantage and works well on a high speed calendar train without sticking or pitting and revulcanizes with a high finished tensile.

As an example of the way the tanned leather is used it is preferably first finely divided or ground and then intimately mixed with the rubber scrap in the digester. The customary alkali devulcanizing process is employed with or without the use of oil. The relative amount of tanned leather added to the rubber scrap will vary somewhat dependent upon the results desired to be obtained and, also, upon the nature of the rubber scrap. If the scrap contain any considerable amount of rubber highly resistant to abrasion or contains a large lamp black content more tanned leather will be required. In practice preferably about 2% to 5% of tanned leather is added to the theoretical weight of rubber in the mass to be treated. The mixture during the devulcanizing process is exposed to steam pressure usually ranging from 100 to 200 pounds, usually about 150 pounds, for periods of from 12 to 24 hours, with the necessary additions of alkali and moisture, depending upon the kind of stock used. The tanned leather is subjected to a very drastic hydrolyzing action while in the digester although this action is for a time resisted or impeded by the nature of the tanned leather which is very resistant to heat and pressure and only breaks down after a period of time. Accordingly the tanned leather is hardly subjected to the hydrolyzing action that raw collagen would be subjected were it used in the digester in place of the tanned leather. In any event the tanned leather is completely broken down, and the rubber scrap subjected to the action of the cleavage products necessarily resulting, while a portion of the cleavage products will remain in the mass after washing, all with the effect of giving a reclaim properly softened and plasticized throughout and remarkably free of tailings, and possessing, also, superior qualities as previously referred to.

Having thus fully described my invention, I claim and desire to secure by Letters Patent of the United States:

1. Reclaimed rubber obtained from rubber scrap by a devulcanizing process having a hydrolytic action, in which the rubber scrap from which the reclaimed rubber is obtained has been subjected to the action of cleavage products obtained from tanned leather during the process of devulcanization of the rubber scrap from which the reclaim is made.

2. Reclaimed rubber obtained from rubber scrap by a devulcanizing process having a hydrolytic action, in which the rubber scrap from which the reclaimed rubber is obtained has mixed with it tanned leather, and both rubber scrap and tanned leather with it subjected to the devulcanizing process.

CHARLES H. CAMPBELL.